United States Patent [19]

Waltner et al.

[11] 3,795,767

[45] Mar. 5, 1974

[54] HIGH VOLTAGE PROTECTION CIRCUIT

[75] Inventors: Ronald Keith Waltner; Marvin Neil Norman, both of Indianapolis, Ind.

[73] Assignee: RCA Corporation, New York, N.Y.

[22] Filed: Aug. 25, 1972

[21] Appl. No.: 283,730

[52] U.S. Cl. ........................ 178/7.5 R, 178/DIG. 11
[51] Int. Cl. ............................................. H04n 5/44
[58] Field of Search ........ 178/7.5 R, 7.3 R, DIG. 11

[56] References Cited

UNITED STATES PATENTS 3,692,933 9/1972 Knoll ............................... 178/7.5 R

*Primary Examiner*—Richard Murray
*Attorney, Agent, or Firm*—Eugene M. Whitacre

[57] ABSTRACT

A high voltage protection circuit for a television receiver for sensing increases in the kinescope ultor voltage above a predetermined level and for blanking the video signals applied to the kinescope during the time the ultor voltage exceeds the predetermined level. Automatic resetting of the video blanking circuit is accomplished during the television retrace intervals to restore displayed video when the ultor voltage drops below the predetermined level.

4 Claims, 1 Drawing Figure

PATENTED MAR 5 1974 3,795,767
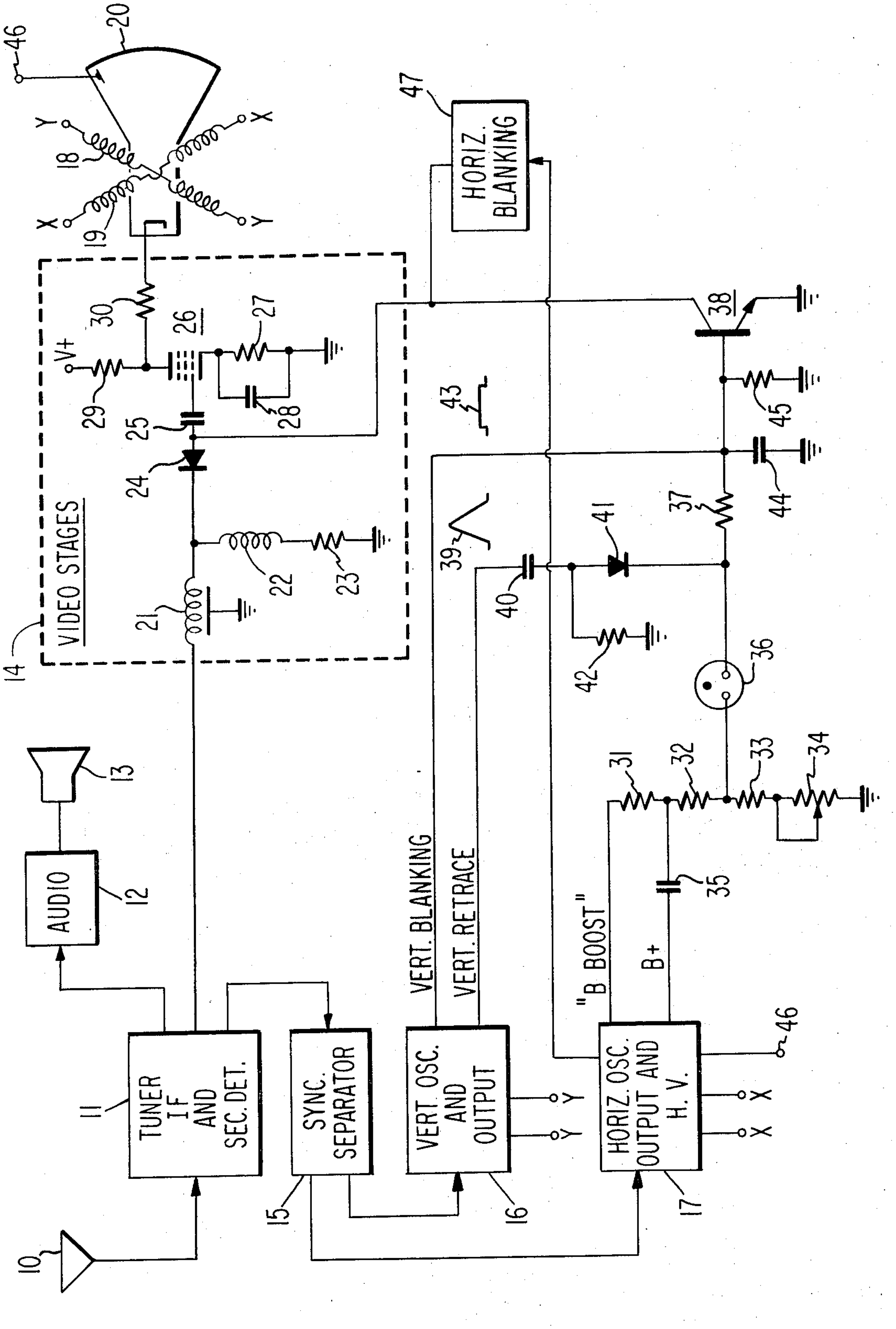

HIGH VOLTAGE PROTECTION CIRCUIT

BACKGROUND OF THE INVENTION

This invention relates to a high voltage protection circuit in a television receiver and, more particularly, to a circuit in which video signals coupled to the picture tube are blanked whenever the ultor supply voltage exceeds a predetermined voltage.

In order to display a satisfactory picture on the viewing screen of a picture tube in a television receiver, it is necessary to use a relatively high ultor voltage applied to the picture tube. This voltage may be in the order of 15,000 volts for black and white receivers and in the order of 26,000 volts for color television receivers. During operation of a color receiver, the picture tube beam current may rise to about 1.5 milliamperes during the time the brightest portion of the scene is being traced on the viewing screen. The upper limits of energy imparted to the electron beams must be controlled because excessive picture tube beam current in the presence of the relatively high ultor voltage could possibly produce soft X-rays.

Therefore, it is desirable to provide a protection circuit which would render the television picture unviewable when the ultor voltage rises above a predetermined level in order to discourage further viewing while the excessively high voltage condition exists. There may be instances in which the ultor voltage rises only momentarily due to some condition in which a transient is developed which causes the rise in ultor voltage. Under these circumstances, while it is desirable for the protection circuit to respond to even the momentary increase in ultor voltage, it is also desirable to ensure that the receiver is returned to a normal operating condition automatically when the period of momentary ultor voltage increase ends.

In accordance with the invention a high voltage protection circuit for a television receiver is provided in which the video modulation is removed from the picture tube electron beam in response to the ultor voltage exceeding a predetermined level. A source of voltage representative of the high voltage variation is sampled. Switching means coupled to the voltage source operates from a first to a second state whenever the voltage source exceeds a predetermined level. Beam current control means coupled to the switching means respond to the second state of the switching means to reduce the beam current. A source of signal occurring during the receiver retrace intervals is coupled to the switching means to cause it to operate from the second to the first state for causing the beam current to return to its normal operating range when the voltage source drops below the predetermined level.

A more detailed description of the invention is given in the following specification and accompanying drawing, the sole FIGURE of which is a block and schematic diagram of a television receiver embodying a high voltage protection circuit according to the invention.

DESCRIPTION OF THE INVENTION

An antenna 10 is coupled to the antenna input terminals of a tuner, IF and second detector portion 11 of a television receiver. The tuner converts the incoming RF signals to the IF frequency, and the IF section amplifies these signals before application to the second detector. One output signal from the second detector is coupled to audio processing circuits 12, which provides suitable audio signals for driving a loudspeaker 13. Signals obtained from the second detector are also coupled to video stages 14, to be described in more detail subsequently, which processes the video signals for providing suitable signals to drive the cathode of the television receiver picture tube 20. Signals from the second detector are also coupled to a sync separator 15, which provides respective vertical and horizontal scanning rate sync signals which are coupled to a vertical oscillator and output circuit 16 and a horizontal oscillator output and high voltage circuit 17.

The vertical oscillator and output circuit 16 provides a source of scanning current obtained from terminals YY which is coupled to corresponding terminals YY of vertical deflection winding 18 mounted around the picture tube 20 for deflecting the beam in a vertical direction. The vertical oscillator and output circuit 16 also provides a source of vertical blanking signals 43, which extend from the end of one vertical scanning interval to the start of the next. The blanking signals 43 are coupled to the base electrode of a transistor 38 utilized in a video blanking circuit.

The video signals coupled to video stages 14 from the tuner, IF and second detector 11 are applied to a delay line 21, which is utilized in a color television receiver to delay the luminance or brightness representative signals an amount corresponding to the delay imparted to the color signals by the color signal processing circuitry, not shown. Delay line 21 is terminated by an inductor 22 serially coupled with a resistor 23 to ground. The video signals obtained from delay line 21 are coupled through serially coupled diode 24 and capacitor 25 to the control grid of a video output tube 26. The cathode of tube 26 is returned to ground through a resistor 27. Resistor 27 is bypassed by a capacitor 28. The plate of video output tube 26 is coupled through a resistor 29 to a source of positive operating potential V+. The signals obtained from the plate of tube 26 are coupled through a resistor 30 to the cathode of picture tube 20. It is to be understood that in a color television receiver the video signals actually would be coupled to three cathodes of the picture tube. The three color signals obtained from the color signal processing circuits, not shown, would be coupled to the three control grids of the picture tube 20. This detail is not shown because it is not necessary for a teaching of the invention. It is to be understood that with the exception of the particular circuits described herein, conventional circuitry may be used for all of the stages in the television receiver.

During the period between vertical scanning intervals, a vertical blanking pulse 43, such as obtained from the conventional vertical oscillator and output circuit 16, is coupled to the base electrode of the NPN video blanking transistor 38. This positive blanking pulse 43 causes transistor 38 to conduct, providing a low impedance path to ground for the video signals obtained from delay line 21. This effectively shorts the video signals during this period and prevents modulation of the electron beam of picture tube 20 by the video signals. In this manner the electron beam current of picture tube 20 is reduced and there is no video signal displayed during the retrace interval when the beam is deflected from the bottom of the screen to the top of the screen.

Obtained from horizontal oscillator, output and high voltage circuit 17 at terminals XX is a source of suitable horizontal rate scanning current, which is coupled to corresponding terminals XX of the horizontal deflection winding 19 mounted around picture tube 20 for deflecting the electron beam in a horizontal direction. Also provided by the horizontal circuit 17 is a source of high voltage or ultor potential obtained at a terminal 46. This voltage, which is in the order of 26 KV in a color television set, is coupled to a corresponding ultor voltage terminal 46 on picture tube 20. This high voltage provides the accelerating potential which attracts the electron beam to the viewing screen of the picture tube. A horizontal blanking circuit 47 receives a pulse from the horizontal circuitry 17 and couples it to the junction of diode 24 and capacitor 25 to blank the video signals during the horizontal retrace interval.

Also obtained from horizontal circuit 17 is a source of "B boost" voltage coupled to a resistor 31. The B boost potential is in the order of +770 volts. Resistor 31 is serially coupled with resistor 32, resistor 33 and potentiometer 34 to ground. These resistors form a voltage divider for the B boost voltage. A capacitor 35 is coupled between the junction of resistors 31 and 32 in the voltage divider and a source of B+ potential in the horizontal circuit. The B+ potential is in the order of 280 volts. Capacitor 35 serves to filter some of the AC ripple from the B boost supply such that it is the average DC value of the B boost voltage which is applied to the voltage divider.

Coupled to the junction of resistors 32 and 33 is a neon light 36. This light has a firing potential in the order of 108 volts such that, when the voltage across it is less than 108 volts, the neon light acts as an effectively open switch. When the voltage across the neon light is greater than 108 volts, the light will light, acting as an effectively closed switch. The terminal of neon light 36 remote from the voltage divider is coupled through a resistor 37 to the base electrode of video blanking transistor 38. The vertical retrace pulses 39, such as obtained from the deflection yoke and having an amplitude of about 50 volts, are AC coupled by a capacitor 40 through a diode 41 which allows the positive portions of this pulse to be applied to the junction of neon light 36 and resistor 37. A resistor 42 coupled between the junction of capacitor 40 and the anode of diode 41 to ground provides a DC reference for the pulses 39 coupled through the diode 41. A capacitor 44 coupled between the base electrode of transistor 38 and ground serves to filter any transients applied to the base electrode. A resistor 45 coupled from the base electrode of transistor 28 to ground provides a DC current path for leakage currents from neon light 36 or the vertical blanking pulse source, which might undesirably turn transistor 38 on at other than the desired time. During operation it will be assumed that the high voltage or ultor supply rises above a predetermined level, such as 26,000 volts, and thereby presents a possible hazardous situation for the television viewer as described above. As the ultor potential rises, so does the B boost voltage since, as is well known, the B boost voltage tracks the ultor potential. Potentiometer 34 in the voltage divider is adjusted such that, during normal operating conditions of the television receiver when the B boost voltage is in the order of 770 volts, the potential at the junction of resistors 32 and 33 is slightly less than the firing potential of 108 volts of neon light 36. As the B boost voltage increases, following the ultor voltage increase, the potential at the junction of resistors 32 and 33 increases above 108 volts. This causes neon light 36 to fire and conduct through resistors 37 and 45. This current increases the voltage at the base electrode of transistor 38 and causes it to conduct. The conduction of transistor 38, as described above, serves to effectively short the video signal as during normal blanking intervals and thereby removes video modulation from the electron beam in picture tube 20 and effectively removes the television picture.

As thus far described, the electron beam current has been reduced as a result of the undesirable rise in ultor potential and the television picture is not displayed. As long as the ultor potential remains above its normal level, it is desirable that the video signals continue to be blanked. However, in the situation in which the ultor potential rises only momentarily due to transient condition, it is desirable to automatically restore the video to the raster by unblanking the video. It is a characteristic of neon light 36 to remain in its fired or conducting condition, even though the voltage across it is again lowered to or somewhat below its firing potential of 108 volts.

The automatic resetting of the video blanking circuit within the high voltage protection circuit is accomplished during the vertical retrace intervals of the television receiver. The vertical retrace pulses 39, having an amplitude of approximately 40 volts, coupled through diode 41 are of sufficient positive amplitude to reduce the voltage across the neon light to below the voltage required for sustaining conduction through neon light 36. Thus, during the interval of the retrace pulses 39, which interval is less than the vertical blanking interval, the high voltage protection switch, neon light 36, is opened by the retrace pulse. As current no longer flows through neon light 36, there is no further current from the B boost supply through resistors 37 and 45 to render transistor 38 conducting. However, since the vertical retrace pulse interval is within the vertical blanking period, transistor 38 is still rendered conducting by the vertical blanking pulse 43.

At the termination of the vertical blanking interval determined by vertical blanking pulse 43 and if the ultor potential and, hence, the B boost voltage have returned to their normal and safe operating values, neon light 36 will not be activated and normal viewing of video can be resumed. If, however, the undesirably high voltage condition of the ultor supply has not subsided, the neon light 36 will fire again immediately at the end of the vertical retrace pulse 39 interval before the end of the vertical blanking interval, thereby ensuring continuing video blanking at the end of the vertical blanking interval.

It should be noted that the resetting of the neon light switch 36 occurs only during the vertical blanking interval. Therefore, the switching action is not visible to the television viewer.

What is claimed is:

1. A high voltage protection circuit for a television receiver, comprising:

a source of voltage representative of variations in the ultor supply voltage of the picture tube of said receiver;

switching means coupled to said source of voltage and responsive to said variations for switching from a first to a second state when said source voltage exceeds a predetermined voltage;

a source of video signals;

a video signal blanking circuit coupled to said source of video signals and to said switching means and responsive to said second state of said switching means for blanking said video signals, thereby causing blanking of said receiver kinescope display;

a source of signals occurring during the retrace intervals of said television receiver; and means coupling said source of retrace interval signals to said switching means for resetting said switching means from said second state to said first state during said retrace interval.

2. A high voltage protection circuit according to claim 1 wherein said switching means is a neon light which acts as an effectively closed switch when said source voltage exceeds said predetermined voltage.

3. A high voltage protection circuit for a television receiver, comprising:

a source of voltage representative of variations in the ultor supply voltage of the picture tube of said receiver;

a neon light coupled to said source and responsive to said variations for switching from a first to a second state when said source voltage exceeds a predetermined voltage;

a source of video signals;

video signal blanking means coupled to said source of video signals and to said neon light and responsive to said second state of said neon light for blanking said video signals;

a source of signals occurring during the vertical retrace intervals of said television receiver; and, means coupling said source of vertical retrace interval signals to said neon light for switching said neon light from said second to said first state during said vertical retrace interval.

4. A high voltage protection circuit according to claim 3 wherein said resetting means include a diode poled to couple the peaks of said vertical retrace pulses to the terminal of said neon light remote from said source of voltage representative of variations in the ultor supply voltage for reducing the voltage across said light below said predetermined voltage for causing said light to extinguish and thereby act as an effectively open switch.

* * * * *